UNITED STATES PATENT OFFICE.

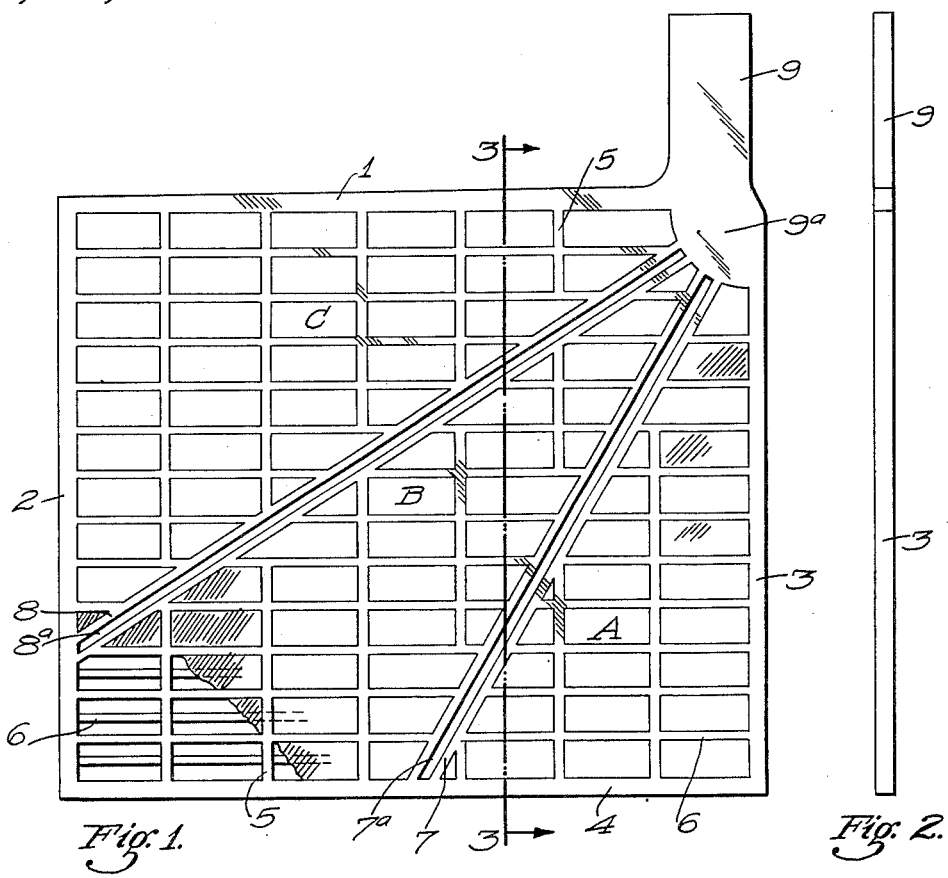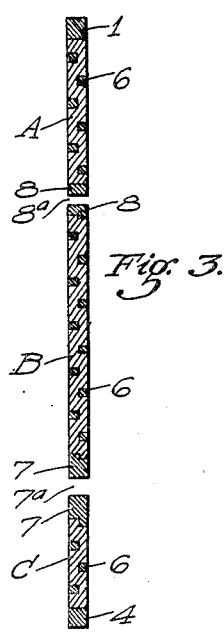

ARTHUR O. GARRETT, OF SAN DIEGO, AND CHRISTOPHER E. FUNNELL AND WILLIAM L. HOFFMAN, OF LOS ANGELES, CALIFORNIA.

STORAGE-BATTERY GRID.

1,408,579.   Specification of Letters Patent.   Patented Mar. 7, 1922.

Application filed October 27, 1920. Serial No. 419,838.

*To all whom it may concern:*

Be it known that we, ARTHUR O. GARRETT, CHRISTOPHER E. FUNNELL, and WILLIAM L. HOFFMAN, citizens of the United States, residing at San Diego, Los Angeles, and Los Angeles, respectively, in the counties of San Diego, Los Angeles, and Los Angeles, respectively, and State of California, respectively, have invented a certain new and useful Storage-Battery Grid, of which the following is a specification.

Our invention relates to storage battery grids more particularly that class in which the active material is held in suspension by a frame work of bars cast from lead and provided with a certain amount of alloy hardening and the objects of our invention are: First, to provide a grid for storage batteries which is so constructed that it will not readily buckle, twist or warp; second to provide a grid of this class with oblique open spaces to provide for expansion; third to provide a grid of this class with oblique reinforcing supporting bars for increasing the strength of the grid; fourth, to provide a grid of this class with greater and quicker conductivity, thus reducing to a minimum its liability to heat; fifth, to provide a grid of this class divided into sections by oblique open spaces, and sixth, to provide a grid of this class which is simple and economical of construction, durable, efficient in its action and which will not readily deteriorate or get out of order.

With these and other objects in view as will appear hereinafter our invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a side elevational view of one of our grids; with the active material in position and showing a portion of said active material broken away; Fig. 2 is an edge view thereof and Fig. 3 is a sectional view through 3—3 of Fig. 1.

Similar characters of reference refer to similar parts and portions throughout the several views of the drawings.

Our grid consists of an outer rectangular supporting frame consisting of the upper member 1, side members 2 and 3, bottom member 4, vertical partitions 5, horizontal partitions 6, oblique partitions 7 and 8 and terminal post member 9.

The outer frame consisting of the members 1, 2, 3, and 4, is substantially the same as the conventional grid supporting frame. The terminal member 9, however, is provided with a downwardly extending portion $9^a$ to which are connected the oblique supports 7 and 8 and the opposite end of the oblique support 7 connects with the member 4 about the middle thereof and the opposite end of the oblique support 8 connects with the member 2 approximately one-third of its length from the bottom. These oblique supports 7 and 8, it will be noted, are double and provided with spaces $7^a$ and $8^a$ so that it will be noted that the grid is divided into three sections A, B and C, the electrolyte filling the spaces $7^a$ and $8^a$ in that portion of the grid which is submerged in the electrolyte. The vertical partitions 5 and horizontal partitions 6 forming sections for holding the active material are substantially the same as the conventional, except that they are intercepted by the oblique supports 7 and 8 as shown. It will be noted that this provides a grid divided into three sections by the two oblique supports 7 and 8 and that these oblique supports provide means for directly conducting the current from the sections to the terminal member 9, thus providing rapid conductivity of the current, reducing the resistance and reducing to a minimum its liability to heat as well as reinforcing the grid diagonally to prevent warping, twisting and buckling.

Though we have shown and described a particular construction combination and arrangement of parts and portions we do not wish to be limited to this particular construction, combination and arrangement but desire to include in the purview of our invention, the construction, combination and arrangement substantially as set forth in the appended claims.

Having thus described our invention what we claim as new and desire to secure by Letters Patent is:

1. A storage battery grid, including a substantially rectangular shaped supporting frame, a terminal at one corner thereof extending inwardly from the supporting frame, a pair of spaced apart oblique supports extending from said terminal to the bottom and side outer supports dividing the grid into three distinct expansion sections, each oblique support being provided with a slot extending therethrough and extending their full length from the terminal to the side and bottom supports.

2. A storage battery grid, including a rectangular supporting frame, vertical and horizontal partitions dividing it into sections for supporting the active material, a plurality of oblique supports extending from the terminal to the different side supports of the supporting frame, each oblique support provided with a longitudinal slot extending therethrough and from the terminal to said side supports separating each oblique support into two portions forming expansion members extending obliquely across the grid from the terminal to the sides.

3. A storage battery grid, including a rectangular shaped member divided into a plurality of distinct expansion sections by oblique supporting members provided with slots therethrough extending from the sides to the terminal, vertical and horizontal supporting partitions parallel with the sides dividing each section into a plurality of smaller sections and active material positioned in said smaller sections.

In testimony whereof, we have hereunto set our hands at Los Angeles, California, this 20th day of October 1920.

ARTHUR O. GARRETT,
CHRISTOPHER E. FUNNELL,
WILLIAM L. HOFFMAN.